J. E. PRICE.
INDICATOR FOR AIR BRAKES.
APPLICATION FILED MAY 7, 1912.
1,183,031.
Patented May 16, 1916.
2 SHEETS—SHEET 1.
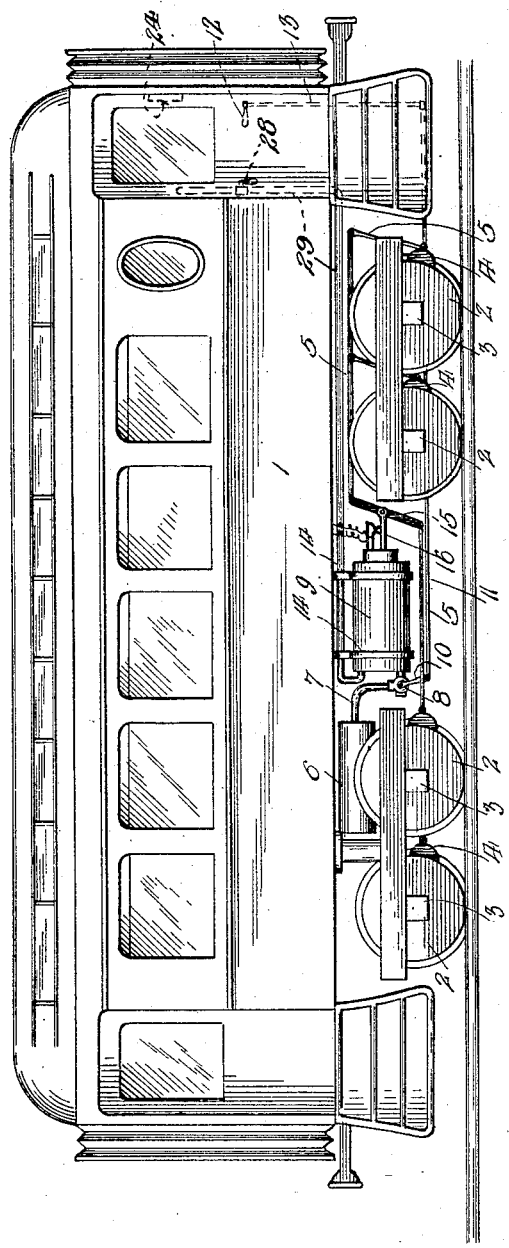
WITNESSES
INVENTOR
John E. Price,
his Attorney

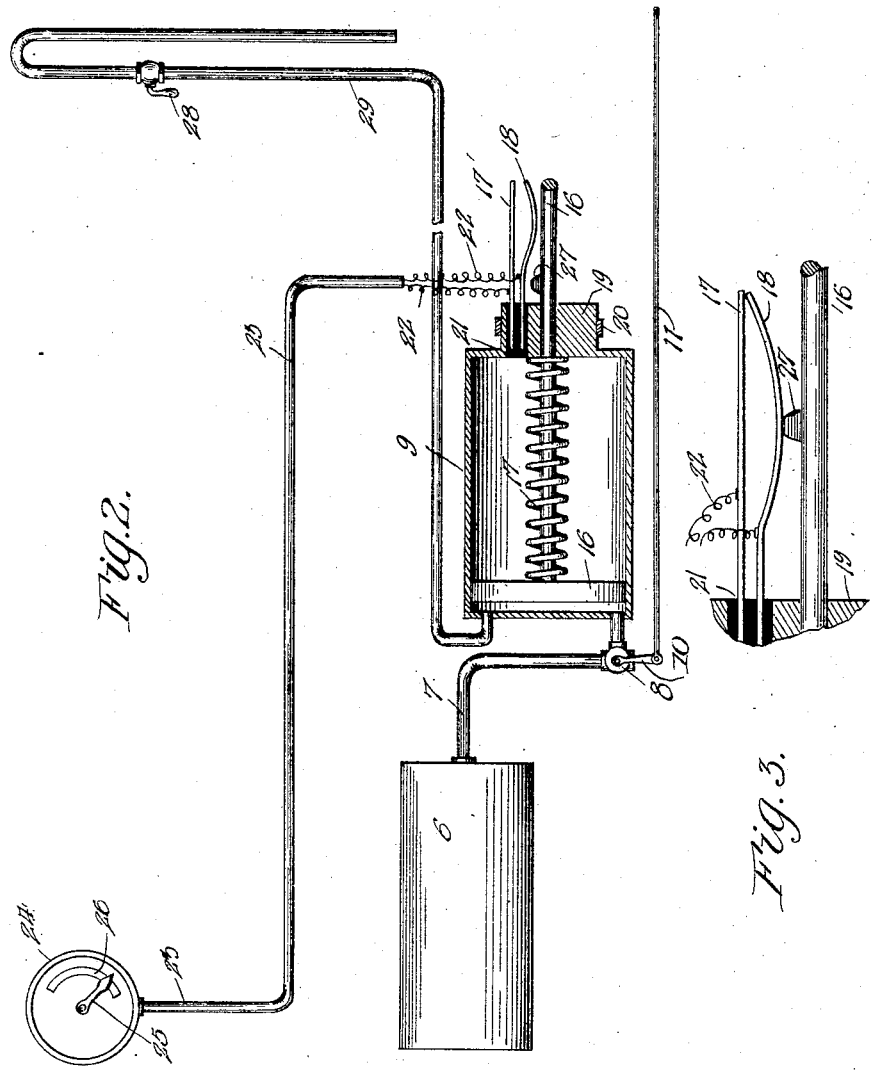

UNITED STATES PATENT OFFICE.

JOHN E. PRICE, OF WILMINGTON, DELAWARE.

INDICATOR FOR AIR-BRAKES.

1,183,031.  Specification of Letters Patent.  Patented May 16, 1916.

Application filed May 7, 1912. Serial No. 695,598.

*To all whom it may concern:*

Be it known that I, JOHN E. PRICE, a citizen of the United States, residing at Wilmington, in the county of New Castle and State of Delaware, have invented new and useful Improvements in Indicators for Air-Brakes, of which the following is a specification.

This invention contemplates the provision of indicating means which are employed to warn the operator of a car that the brakes which have been applied have or have not moved out of engagement with the wheels if the air has been exhausted from the brake cylinder.

Applicant is aware that indicators are now employed in connection with air brakes but they have not proven reliable in certain instances. The form of indicator which applicant is referring to is one which consists of an air cylinder connected to the brake cylinder of the car, the air cylinder having mounted therein a reciprocating piston carrying a pointer. When air is admitted into the brake cylinder it travels into the air cylinder and forces the piston upwardly so as to indicate that the brakes have been applied. Now when the air is exhausted from the brake cylinder the piston moves to its normal position and the indicator indicates that the brakes have been removed from the wheels. It has been found to be the case that numerous times when the air is exhausted from the brake cylinder that the brakes are not removed from the wheels and if the register above referred to is used it will indicate that the brakes have been removed and an accident will probably occur as is obvious.

The principal object of my invention is to overcome the above mentioned difficulty by the provision of a simple, durable and efficient indicating means which will not register that the brakes have been removed from engagement with the car wheels unless the brake operating piston has been moved in the brake cylinder.

In attaining the end sought by the present invention, it is essential that means be provided to relieve the pressure or exhaust the compressed air behind the piston in the brake cylinder, and that such means be operable from a point where an indicator operated through movement of the piston may be readily observed, whereby the said means may be immediately operated from the train, as contrasted with stopping the train, alighting from the train and manually restoring the brake or brakes to proper position.

The means which I have devised can easily be attached or detached to or from a car and comprises an air brake system which can be understood, operated, repaired or removed by a person unskilled in this art.

In pursuance of the above mentioned remarks the brake cylinder is provided with spaced apart contact fingers which are normally out of engagement with each other. The lower of the contact fingers is bent downwardly so as to be engaged at certain times by an offset portion on the brake operating piston rod. When brakes are in engagement with the wheels, the piston is moved so as to cause the contacts to engage and the fingers being in an electric circuit with an ordinary indicator will have closed the circuit and indicate that the brakes have been applied. Now if the air is exhausted from the brake cylinder and the brake piston fails to move, the register will still indicate that the brakes are applied and as soon as the operator recognizes this fact he can operate such means as will move the piston and release the brakes from the wheel.

With the above and other objects in view my invention consists in such details of construction and in the arrangement and combination of parts as will be hereinafter more fully described and specifically pointed out in the appended claims.

In describing my invention in detail, reference will be had to the accompanying drawings wherein like characters denote like or corresponding parts throughout the several views, and in which:—

Figure 1 is a side elevation of a car showing my invention in place thereon. Fig. 2 is a view of the elements comprising my invention detached from the car, being shown mostly in elevation but partly in section. Fig. 3 is a fragmentary view illustrating the circuit-closing parts employed.

In the accompanying drawings wherein is illustrated the preferred form of my invention the numeral 1 designates the body of an ordinary railway coach which is supported by wheels 2, the said wheels being operative on the axles 3 as is well known. The car with which my device has been illustrated forms no part of the present invention and I desire it to be understood that other forms may be substituted without deviating from the spirit of the invention embodied herein. Brake shoes 4 which are carried by arms 5 are operable against the periphery of the wheels in such a manner as to positively control their motion. A tank designated by the numeral 6 is supported beneath the car by any suitable means and adapted to hold air under pressure. An outlet pipe 7 from the tank is provided which has mounted therein a two-way valve 8 and has connection with the brake cylinder 9 as shown. The two-way valve is controlled through the medium of an actuating or shifting member in the form of a finger 10 and a rod 11 pivoted thereto which has connection with a hand lever 12 through the medium of an upright 13 forming part of said rod 11 and which is carried upon the front of the coach and in ready touch of the operator.

Brackets 14 are provided for supporting the brake cylinder 9 and have connection with the underside of the body of the coach by any suitable means, I not limiting myself to any specific form. Operative within the brake cylinder and having connection with a cross beam or arm 15 which is pivotally connected to the arms 5 is a rod of a reciprocating piston 16 as shown. The piston is normally held at the rear end of the brake cylinder through the medium of an extension or compression spring 17. However when air is admitted to the brake cylinder, the head of the piston will be forced against the tension of the spring to move the arms 5 so as to apply the brakes or force the brakes into engagement with the wheels.

For the purpose of supporting contact fingers 17′ and 18 which are employed, the lower end the latter of which has a portion thereof bent downwardly as shown, an extension 19 is provided upon the brake cylinder which extension is surrounded by a band 20 for the purpose of securely holding insulating material 21 in place. The insulation has fastened therein the said fingers and insulates them from each other so that all danger of a short circuit being completed is obviated. The fingers have connection with conductors 22 which extend through or into a conduit 23 and have connection with an indicator 24 as clearly shown. The indicator is of the ordinary type and has a usual finger 25 operating upon its dial 26 which carries suitable graduations. An offset portion or lug 27 is provided upon the piston rod which offset portion is adapted at certain times to engage the lower of the contact fingers at the bent or deflected portion previously mentioned whereby the lower finger will be forced into engagement with the other finger and thereby complete an electric circuit which will operate the pointer 25 so that it will properly register with respect to the indicator.

The operation of my device may be as follows: When the brake shoes are out of engagement with the wheels the piston is in its rearmost position in the cylinder 9, being thus maintained by the spring 17, and the contact fingers accordingly are out of engagement with each other whereby the pointer 25 of the indicator will register at the word "off". Now when the brakes are to be applied the valve 8 is opened so as to admit air under pressure from the cylinder 6 into the brake cylinder, and this air will act against the piston head shifting or sliding the piston and compressing the coil spring thereby applying the brakes and moving the offset portion 27 into engagement with the lowermost of the contact fingers so as to shift the latter finger into engagement with the finger 17 to close the circuit there between and consequently move the arrow upon the indicator to the word "on". If the valve 8 is now actuated to exhaust the air from the cylinder 9 and the brakes stick or adhere to the wheels 2 the piston will not be moved at all thereby still maintaining a closed electric circuit through the indicator and holding the finger at the word "on". As soon as the operator realizes this fact he may open a cock or valve 28 in a pipe 29 which has suitable connection with the cylinder 9 so as to exhaust any air under pressure which remains therein and allow the piston to move to its rearmost position and thereby remove the brakes from the wheels.

Inasmuch as the downwardly extending vertical portion of pipe 29 is returned toward and terminates practically at one end of the main horizontal portion of the pipe 29, such downwardly extending portion extends below the platform or floor of the car so as to exhaust the air exteriorly of the car. It will be realized that with exhaust pipes similar to 29 having their exhaust end interior of the car, the exhaust is discharged directly into the car, the air causing a disturbance of the dust within the car with the usual unpleasant effects for instance, inhalation thereof and settlement thereof on the clothes. I overcome these objections by extending the exhaust portion of the pipe below and exterior of the car platform or floor so that the exhaust will occur in the atmosphere exterior of the car.

While the foregoing is an illustration of the operation of my device it is to be understood that the same can be employed for different other purposes and operated in a different manner when occasion requires and that I have not limited myself to the specific operation disclosed herein.

From the foregoing it is thought that the advantages and novel features of my invention will be readily appreciated.

I desire it to be understood that I may make slight changes in the construction and in the arrangement and combination of parts provided such changes fall within the scope of the subjoined claims.

Having thus described my invention what I claim as new and desire to secure by Letters Patent is:

1. In combination with a body portion of a car and wheels for supporting the same, of brake means for one of said wheels, a brake cylinder member carried by said body, a piston member operative in said cylinder having a rod in connection with said brake means, an indicator operative through the opening and closing of an electric circuit, said circuit having therein a plurality of normally disengaged contacts arranged out of alinement with said rod, one of said contacts movable to engage the other contact upon movement of said piston, and thereby closing the circuit through said indicator.

2. In combination with a body portion of a car and wheels for supporting the same, a brake means for one of said wheels, a brake cylinder member carried by said body, a piston member operative in said cylinder having a rod in connection with said brake means, an indicator operative through the opening and closing of an electric circuit, said circuit having therein a plurality of normally disengaged contacts arranged out of alinement with said rod, one of said contacts movable to engage the other contact, one of said members having means to engage said movable contact to shift same into engagement with the other contact, thereby closing the circuit through said indicator.

3. In combination with a body portion of a car and wheels for supporting the same, of brake shoes operative in relation to said wheels, arms extending from said brake shoes and having connection with a pivoted cross beam, a brake cylinder carried by the body of the car, a piston operative within said brake cylinder and having connection with said cross beam, contact fingers carried by said cylinder and means carried by said piston adapted to engage the lower of said contact fingers so as to move it into engagement with the other of said fingers thereby closing an electric circuit through an indicator for the purpose described.

4. In combination with a railway coach and wheels supporting the same, of a tank mounted below said coach and holding air under pressure, a brake cylinder for connection with said tank, a piston operative within said brake cylinder, brake shoes supported by a plurality of arms, said arms having connection with a cross beam, said cross beam having connection with said piston, an indicator mounted in said coach, contact fingers carried by said brake cylinder, electrical conductors connecting said contact fingers and said indicator and means carried by said piston adapted to move said fingers into engagement with each other thereby closing an electric circuit through said indicator for the purpose described.

5. In combination with car body and wheels for supporting same, of a tank mounted beneath said body and adapted to hold air under pressure, a brake cylinder supported beneath said body, a pipe connecting said tank and said brake cylinder, a valve in said pipe, a piston operating within said brake cylinder, brake shoes supported adjacent said wheels, arms supporting said brake shoes and having connection with said piston, contact fingers carried by said brake cylinders, an indicator carried by said car, electrical conductors having connection with said indicator and said fingers, said valve adapted to admit air in said brake cylinder whereby said piston is moved so as to throw said brake shoes into engagement with said wheels and means carried by said piston adapted to move said contact fingers into engagement with each other thereby closing an electric circuit through said indicator for the purpose described.

6. In combination with a car body and wheels for supporting the same, of a tank mounted below said body and adapted to hold air under pressure, a brake cylinder mounted beneath said body, a pipe connecting said tank and said brake cylinder, said pipe having a valve mounted therein, a piston operative within said brake cylinder, brake shoes mounted adjacent to said wheels and supported by a plurality of arms, means connecting said arms and said piston, said valve adapted to admit air into said brake cylinder whereby said piston is moved so as to throw said shoes into engagement with said wheels, contact fingers carried by said brake cylinder, and an indicator carried by said car, electrical conductors connecting said indicator and said contact fingers and an offset portion formed upon said piston adapted to move said contact fingers into engagement with each other whereby an electric circuit is closed through said indicator for the purpose described.

7. In combination with a car body and wheels for supporting the same, of a tank mounted below said body and adapted to hold air under pressure, a brake cylinder supported by a plurality of brackets beneath said body, a pipe connecting said tank and said brake cylinder, said pipe having a two-way valve mounted therein, a piston operative within said brake cylinder, brake shoes mounted adjacent to said wheels and supported by a plurality of arms, means for connecting said arms and said piston, said valve adapted to admit air into said brake cylinder whereby said piston may be moved to throw said brake shoes into engagement with said wheels, a pair of contact fingers carried by said brake cylinder and insulated therefrom, the lower one of said contact fingers having a portion thereof bent downwardly, an indicator mounted in said body, electrical conductors connecting said indicator and said fingers, an offset portion formed upon said piston whereby said contact fingers may be forced into engagement with each other and an electric circuit closed through said indicator for the purpose described.

JOHN E. PRICE.

Witnesses:
HARRY T. WARE,
CHARLES M. TOWNSEND.

Copies of this patent may be obtained for five cents each, by addressing the "Commissioner of Patents, Washington, D. C."